United States Patent
Dwork

(10) Patent No.: US 6,915,356 B1
(45) Date of Patent: Jul. 5, 2005

(54) REGISTER ADDRESSES OPTIMUM ACCESS

(75) Inventor: Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 600 days.

(21) Appl. No.: 09/488,783

(22) Filed: Jan. 21, 2000

Related U.S. Application Data

(60) Provisional application No. 60/169,272, filed on Dec. 7, 1999.

(51) Int. Cl.[7] .......................... G06F 12/02; G06F 13/28
(52) U.S. Cl. .............................. 710/9; 710/8; 711/202; 711/209
(58) Field of Search ............................. 710/3, 4, 8–10, 710/35, 100, 305, 313, 33; 711/1, 3, 100, 154, 163, 170, 173, 200, 202, 209

(56) References Cited

U.S. PATENT DOCUMENTS

| | | | | |
|---|---|---|---|---|
| 4,177,462 A | * | 12/1979 | Chung | 345/22 |
| 4,916,301 A | * | 4/1990 | Mansfield et al. | 345/440 |
| 5,440,714 A | | 8/1995 | Wang | 395/492 |
| 5,721,868 A | | 2/1998 | Yung et al. | 395/476 |
| 5,752,073 A | * | 5/1998 | Gray et al. | 712/1 |
| 5,805,842 A | | 9/1998 | Nagaraj et al. | 395/306 |
| 6,189,082 B1 | * | 2/2001 | Ramamurthy | 711/170 |

OTHER PUBLICATIONS

Anido, Manual L. and Allerton, David J., RISC Design for Computer Image Generation, 2407 Microprocessors and Microsystems, vol. 14 (1990) Jul./Aug., No. 6, London, GB.

* cited by examiner

Primary Examiner—Ilwoo Park

(57) ABSTRACT

A register arrangement that enables a host CPU to optimize its accesses to registers in a network interface in order to reduce the impact of such accesses on the CPU performance. Registers that must frequently be read by the CPU are combined into a first group and assigned with consecutive addresses corresponding to one end of the register address range. Registers that must frequently be written by the CPU are grouped into a second group and assigned with consecutive addresses corresponding to the opposite end of the register address range. Registers that must frequently be both read and written by the CPU are combined into a third group and assigned with consecutive addresses between the addresses of the first group and addresses of the second group.

14 Claims, 3 Drawing Sheets

| Address | Register Name |
|---|---|
| 30 | Stat 0 |
| 34 | Stat 1 |
| 38 | Int 0 |
| 3c | Int 1 |
| 40 | Inten 0 |
| 44 | Inten 1 |
| 48 | Cmd 0 |
| 4c | Cmd 1 |
| 50 | Cmd 2 |
| 54 | Cmd 3 |

| Address | Register Name |
|---|---|
| 30 | Stat 0 |
| 34 | Stat 1 |
| 38 | Int 0 |
| 3c | Int 1 |
| 40 | Inten 0 |
| 44 | Inten 1 |
| 48 | Cmd 0 |
| 4c | Cmd 1 |
| 50 | Cmd 2 |
| 54 | Cmd 3 |

FIG. 3

REGISTER ADDRESSES OPTIMUM ACCESS

This patent application claims priority of U.S. provisional patent application No. 60/169,272 entitled "Register Arrangement for Optimum Access", filed on Dec. 7, 1999.

FIELD OF THE INVENTION

The present invention relates to data processing, and more particularly, to arranging registers so as to provide optimum access to them.

BACKGROUND ART

In a computer system including a CPU and a memory subsystem, a network controller communicates with the CPU and the memory via a PCI bus. In particular, the CPU writes and reads various control and status bits to and from multiple registers in the network controller to initiate and complete frame transmission and reception, to ascertain the status of the network controller, and to control its functions.

Direct access to registers in the network controller via a PCI bus substantially slows the operation of the CPU. Therefore, it would be desirable to arrange the registers so as to reduce the impact of such access on the CPU performance.

DISCLOSURE OF THE INVENTION

The present invention offers a novel method of arranging registers in a data processing system to optimize host processor's access to the registers. Registers frequently accessed by the host processor only for reading data may be combined into a first group. The registers of this group are assigned with consecutive addresses corresponding to a first end of a register address. Registers frequently accessed by the host processor only for writing data may be combined into a second group. The registers of this group are assigned with consecutive addresses corresponding to a second end of the register address range opposite with respect to the first end.

Further, registers that must frequently be both read and written by the host processor may be combined into a third group. The registers of the third group are assigned with consecutive addresses between the addresses of the first group and the addresses of the second group.

In accordance with one aspect of the present invention, the data processing system comprises a host processor, and a register block containing multiple registers accessible by the host processor. The register block includes the first register group combining registers that must frequently be read by the host processor, and the second register group combining registers that must frequently be written by the host processor. Also, the register block may comprise the third register group combining registers that must frequently be both read and write accesses by the host processor.

For example, the first register group may comprise registers requiring only read accesses by the host processor during normal operation of the system, the second register group may comprises registers requiring only write accesses by the host processor during the normal operation, and the third register group may comprise registers requiring both read and write accesses by the host processor.

In accordance with another aspect of the invention, the host processor may access the register block via a PCI interface. The arrangement of the registers in the register block enables the host processor to access the registers of the first register group in a single PCI burst read transaction, and to access the registers of the second register group in a single PCI burst write transaction.

Moreover, the present invention allows the host processor to access the registers of the first and third register groups in a single PCI burst read transaction, and to access the registers of the second and third register groups in a single PCI burst write transaction.

For example, the host may perform read access to the registers of the first and third groups in a single burst read transfer. Then, the host may carry out write access to the registers of the second and third groups in a single burst write transfer.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 is a block diagram illustrating an exemplary register address range of the present invention.

BEST MODE FOR CARRYING-OUT THE INVENTION

Although the invention has general applicability in the field of data processing, the best mode for practicing the invention is based in part on the realization of a network interface in a packet switched network, such as an Ethernet (IEEE 802.3) network.

Figure 1:
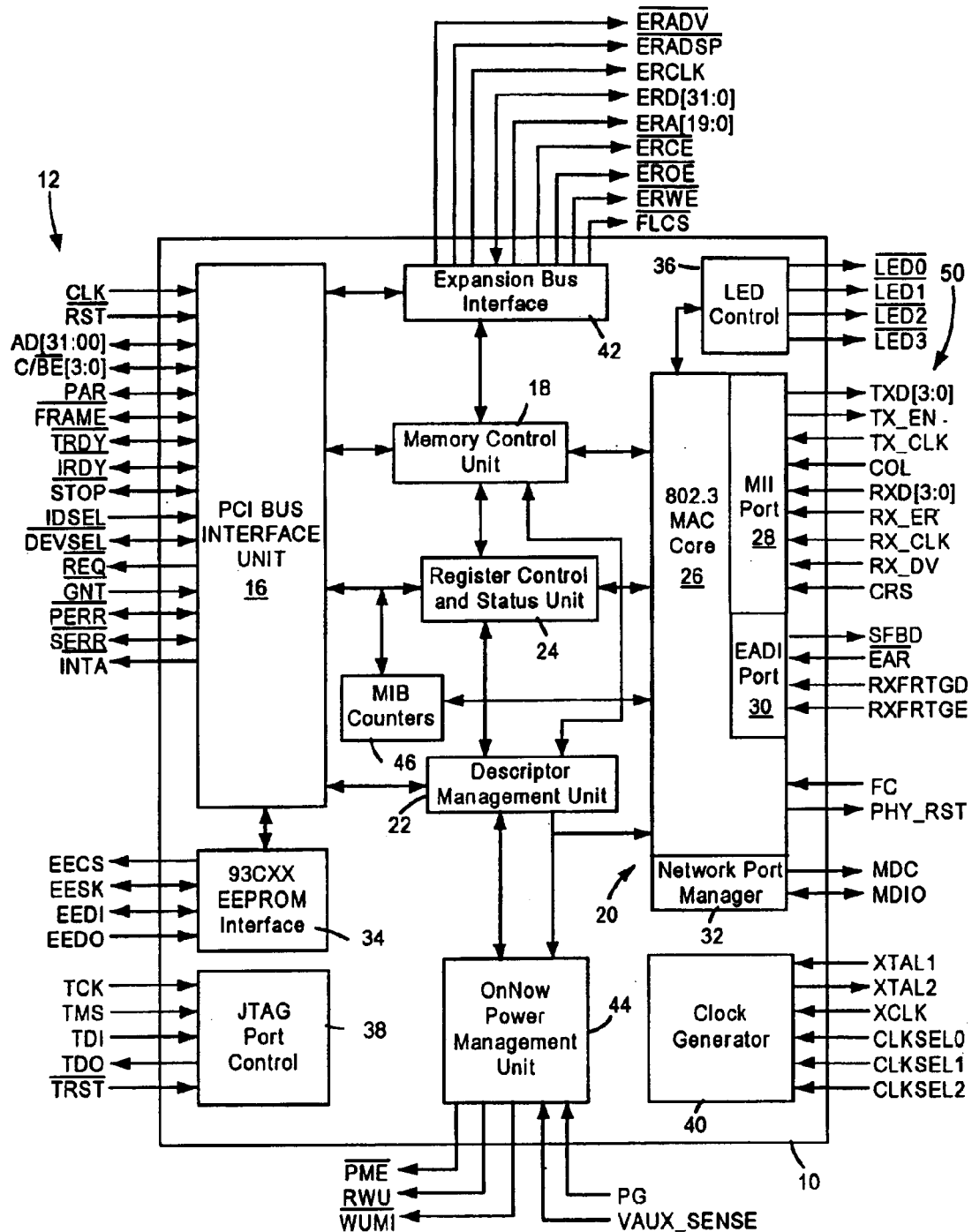
FIG. 1 is a block diagram of an exemplary network interface, in which the present invention may be implemented.

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
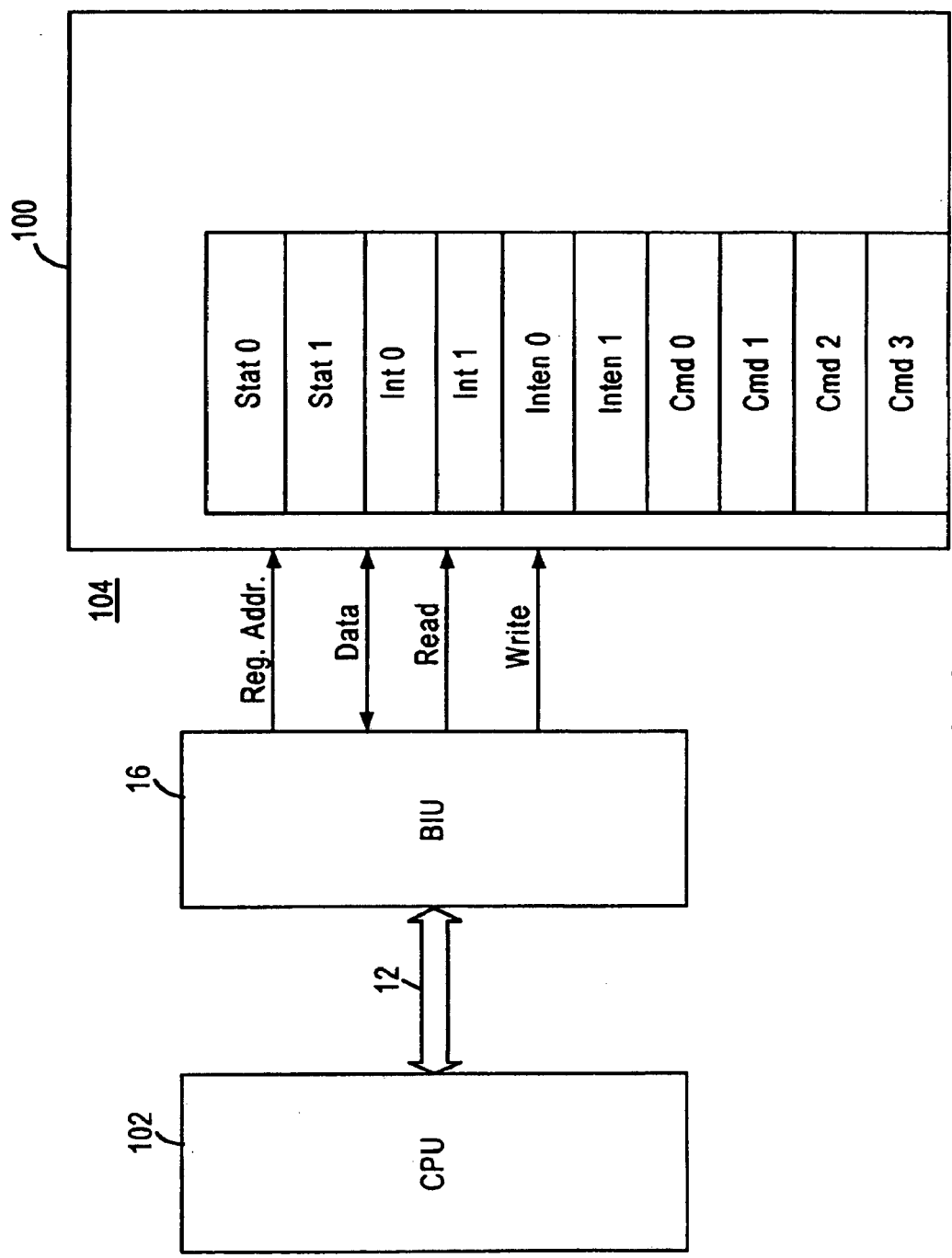
FIG. 2 is a block diagram illustrating a register access scheme of the present invention.

Referring to FIG. 2, the network interface 10 comprises a register logic block 100 that manages top-level registers of the network interface 10 accessible to the host CPU 102. The register logic block 100 is coupled to the PCI bus interface unit 16 via a register interface 104 to allow read and write accesses to the registers. The PCI bus interface 16 recognizes PCI read and write accesses by the host CPU 102 to the registers, and sends register address signal and write and read signals to the register logic block 100. The register address signal identifies a register to be accessed from the PCI bus 12. The write and read signals identify whether a write or read access operation is being performed. Data being written or read to or from the accessed register is transferred via the PCI bus 12 and a data bus in the register interface 104.

For example, the register logic block 100 may include a decoder and multiple global registers such as command registers cmd0 to cmd3, status registers stat0, stat1, interrupt registers int0, int1, and interrupt enable registers inten0, inten1. The decoder decodes the address of the register being accessed via the PCI bus interface unit 16, and provides access to the selected register.

The command registers may contain control bits interpreted as commands by various blocks of the network interface 10. For example, the command registers may contain such commands as a EEPROM read command that instructs the network interface 10 to perform a read operation of the EEPROM attached to the network interface 10, start transmit and start receive commands for enabling frame transmit and receive operations, an end of transmit frame command indicating that the last byte of the frame to be transmitted has been loaded, etc.

The status registers may contain status bits for indicating the status of certain network interface operations. For example, the status registers may comprise status bits indicating current and next transmit and receive statuses.

The interrupt registers may comprise interrupt status bits corresponding to various transmit and receive interrupt events. Among transmit interrupt events are transmit descriptor interrupts asserted when a transmit descriptor has been processed, free bytes interrupts asserted when a certain number of bytes become free in the transmit buffer, transmit frame complete interrupts indicating that a transmit frame has been either successfully transmitted to the network or aborted due to error conditions, etc. Receive interrupt events include receive frame complete interrupts indicating that an entire receive frame is processed, receive out-of-descriptor interrupts asserted when the network adapter wants to transfer receive data to the system memory but no receive descriptor is available, etc. The interrupt bits are sent to the PCI bus interface unit 16 for activating the interrupt request output INTA/.

The interrupt enable registers may contain interrupt enable bits associated with the interrupt status bits in the interrupt registers. The interrupt enable bits are set to a predetermined state to enable the activation of the interrupt request output INTA/ in response to the corresponding interrupt status bits.

Direct access to the registers in the network interface via a PCI bus substantially slows the operation of the CPU. To reduce the impact of such access on the CPU performance, the present invention offers a novel arrangement of registers in the register logic block 100. The registers are arranged so as to provide optimum CPU's access to them. In particular, an address of a register in the register block 100 is assigned in accordance with a frequency of write or read accesses to that register by the PCI host.

For example, registers that must frequently be read by the CPU 102 are grouped together and assigned with consecutive addresses corresponding to one end of a register address range employed in the network interface 10. Registers that must frequently be written by the CPU 102 are grouped together and assigned with consecutive addresses corresponding to the opposite end of the register address range. Registers that must frequently be both read and written by the CPU 102 are grouped together and assigned with consecutive addresses between the addresses of the first group and the addresses of the second group.

FIG. 3 shows an exemplary register mapping table illustrating a register address range of the register block 100. For example, during normal operation of the network interface 10, the CPU 102 performs only read accesses to the status registers stat0 and stat1 to read status information. Write accesses to these registers are not necessary. Therefore, the status registers stat0 and stat1 may be grouped together and assigned with addresses corresponding to a lower end of the register address range. For example, the status registers stat0 and stat1 may be respectively assigned with addresses 30 and 34 in the hexadecimal notation.

During normal operation of the network interface 10, the command registers and interrupt enable registers are accessed by the CPU 102 only for writing data. Read accesses by the CPU 102 to these registers are not necessary. Thus, the command registers and interrupt enable registers may be grouped together and assigned with addresses corresponding to a higher end of the register address range. For example, the command registers cmd3, cmd2, cmd1, and cmd0 may be respectively assigned with addresses 54, 50, 4c, and 48 in the hexadecimal notation. The interrupt enable registers inten1 and inten0 may be respectively assigned with addresses 44 and 40 in the hexadecimal notation.

The CPU 102 performs read accesses to the interrupt registers int0 and int1 to read interrupt status bits indicating interrupt events. After reading the interrupt registers int0 and int1, the CPU 102 performs write accesses to these registers to clear the interrupt status bits. Thus, the interrupt registers int0 and int1 must frequently be both read and written by the CPU 102. Therefore, these registers are grouped and assigned with addresses between the lower addresses assigned to the group combining the status registers and the higher addresses assigned to the group combining the command and interrupt enable registers. For example, the interrupt registers int0 and int1 may be respectively assigned with addresses 38 and 3c in the hexadecimal notation.

The registers may be designed so as to provide a read access to a register without changing the state of the network interface 10 or the value of any bit in the register.

The register arrangement of the present invention enables the CPU 102 to perform access to a group of registers having consecutive addresses using a single burst transfer. In particular, a first group of registers that should be only read by the CPU 102 may be accessed in a single burst read transfer via the PCI bus 12. A second group of registers that are only written by the CPU 102 may be accessed in a single burst write transfer via the PCI bus 12.

Moreover, a third group of registers that should be read and written by the CPU 102 may be assessed for reading during the burst read transfer performed to access the first group of registers, and assessed for writing during the burst write transfer performed to access the second group of registers.

For example, in response to the activation of the interrupt request pin INTA/, the CPU 102 may read the stat0, stat1, int0 and int1 registers having consecutive addresses using a single burst read transfer via the PCI bus 12. Then, the CPU 102 will perform write accesses to the int0 and int1 registers and, if necessary, to the inten0, inten1, cmd0, cmd1, cmd2 and cmd3 registers using a single burst write transfer via the PCI bus 12.

There accordingly has been described a register arrangement that enables the host CPU to optimize its accesses to registers in the network interface 12 in order to reduce the impact of such accesses on the CPU performance. Registers that must frequently be read by the CPU are combined into a first group and assigned with consecutive addresses corresponding to one end of the register address range. Registers that must frequently be written by the CPU are grouped into a second group and assigned with consecutive addresses corresponding to the opposite end of the register address range. Registers that must frequently be both read and written by the CPU are combined into a third group and assigned with consecutive addresses between the addresses of the first group and addresses of the second group.

Thus, the host CPU is enabled to perform read accesses to the registers of the first and third groups in a single burst read transaction via the PCI bus, and to perform write accesses to the registers of the second and third groups in a single PCI burst write transfer. As accesses to registers having consecutive addresses in a single PCI burst transaction are performed much faster than individual PCI accesses to each register, the present invention substantially improves the performance of the computer system.

Those skilled in the art will recognize that the present invention admits of a number of modifications, within the spirit and scope of the inventive concepts. For example, register addresses may be arranged in a number of different ways.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of providing access to registers in a data processing system having registers directly accessible by a host processor, the method comprising the steps of:

combining into a first group, registers that must frequently be read by the host processor, assigning to the registers in the first group, consecutive addresses corresponding to a first end of an address range, combining into a second group, registers that must frequently be written by the host processor, assigning to the registers in the second group, consecutive addresses corresponding to a second end of the address range opposite with respect to the first end, accessing the registers in the first group in a single burst read transfer, accessing the registers in the second group in a single burst write transfer, combining into a third group, registers that must frequently be both read and written by the host processor, assigning to the registers in the third group, consecutive addresses between the addresses of the first group and the addresses of the second group, accessing the registers in the first and third groups in the same burst read transfer, and accessing the registers in the second and third groups in the same burst write transfer.

2. A data processing system comprising:

a host processor, and a register block containing multiple registers accessible by the host processor, the register block including:

a first register group combining registers that must frequently be read by the host processor, and a second register group combining registers that must frequently be written by the host processor, the register block being arranged to enable the host processor to access the registers in the first register group in a single burst read transfer, the register block being arranged to enable the host processor to access the registers in the second register group in a single burst write transfer, wherein the register block comprises a third register group combining registers that must frequently be both read and written by the host processor, and the register block is arranged to enable the host processor to access the registers in the first and third register groups in the same burst read transfer, and to access the registers in the second and third register groups in the same burst write transfer.

3. The system of claim 2, wherein the registers in the third register group are assigned with consecutive addresses between addresses of the first register group and addresses of the second register group.

4. The system of claim 3, further comprising a PCI interface for providing access of the host processor to the register block.

5. The system of claim 4, wherein the register block is arranged to enable the host processor to access the registers of the first register group in a single PCI burst read transaction.

6. The system of claim 4, wherein the register block is arranged to enable the host processor to access the registers of the second register group in a single PCI burst write transaction.

7. The system of claim 4, wherein the register block is arranged to enable the host processor to access the registers of the first and third register groups in a single PCI burst read transaction.

8. The system of claim 4, wherein the register block is arranged to enable the host processor to access the registers of the second and third register groups in a single PCI burst write transaction.

9. The system of claim 2, wherein the first register group comprises registers requiring only read accesses by the host processor, the second register group comprises registers requiring only write accesses by the host processor, and the third register group comprises registers requiring both read and write accesses by the host processor.

10. A method of providing a host with access to registers via a PCI interface, comprising the steps of:

combining into a group, registers that must frequently be accessed by the host, and accessing all registers of the group using a single PCI burst transaction, wherein the step of combining comprises:

combining into a first group, registers that must frequently be read by the host, and combining into a second group, registers that must frequently be written by the host; and the step of accessing comprises:

accessing all registers of the first group using a single PCI burst read transaction, and all registers of the second group using a single PCI burst write transaction, the method further comprising the steps of:

combining into a third group, registers that must frequently be both read and written by the host, and accessing all registers of the first and third groups using a single PCI burst read transaction.

11. The method of claim 10 further comprising the steps of:

accessing all registers of the second and third groups using a single PCI burst write transaction.

12. The method of claim 11 further comprising the steps of:

providing the host with read access to the registers of the first and third groups in a single burst read transfer, and thereafter, providing the host with write access to the registers of the third group in a single burst write transfer.

13. The method of claim 12, wherein the host is provided with write access to the registers of the second and third groups using the single burst write transfer.

14. The method of claim 10, wherein the first group comprises registers requiring only read accesses by the host processor, the second group comprises registers requiring only write accesses by the host processor, and the third group comprises registers requiring both read and write accesses by the host processor.

* * * * *